US011588573B2

(12) United States Patent
Dong et al.

(10) Patent No.: US 11,588,573 B2
(45) Date of Patent: Feb. 21, 2023

(54) SYSTEM AND METHOD FOR TERAHERTZ POLARIZATION-DIVISION MULTIPLEXING

(71) Applicant: INSTITUT NATIONAL DE LA RECHERCHE SCIENTIFIQUE, Québec (CA)

(72) Inventors: Junliang Dong, Longueuil (CA); Alessandro Tomasino, Montreal (CA); Giacomo Balistreri, Longueuil (CA); Aycan Yurtsever, Longueuil (CA); José Azaña, Montreal (CA); Yoann Jestin, Montreal (CA); Roberto Morandotti, Montreal (CA)

(73) Assignee: INSTITUT NATIONAL DE LA RECHERCHE SCIENTIFIQUE, Quebec (CA)

( * ) Notice: Subject to any disclaimer, the term of this patent is extended or adjusted under 35 U.S.C. 154(b) by 0 days.

(21) Appl. No.: 17/305,925

(22) Filed: Jul. 16, 2021

(65) Prior Publication Data

US 2022/0021473 A1    Jan. 20, 2022

Related U.S. Application Data

(60) Provisional application No. 63/053,181, filed on Jul. 17, 2020.

(51) Int. Cl.
*H04J 14/06* (2006.01)
*H01P 3/10* (2006.01)
*G02B 6/293* (2006.01)

(52) U.S. Cl.
CPC ............ *H04J 14/06* (2013.01); *G02B 6/2938* (2013.01); *G02B 6/29302* (2013.01); *H01P 3/10* (2013.01)

(58) Field of Classification Search
CPC ... H04J 14/06; G02B 6/2938; G02B 6/29302; H01P 3/10
See application file for complete search history.

(56) References Cited

U.S. PATENT DOCUMENTS 10,381,703 B2 * 8/2019 Henry .................. H01P 3/16
10,992,343 B1 * 4/2021 Willis, III ............. H01P 5/087
(Continued)

OTHER PUBLICATIONS

Ellis, A. D., Suibhne, N. Mac, Saad, D. & Payne, D. N. Communication networks beyond the capacity crunch. Philos. Frans. R. Soc. A Math. Phys. Eng. Sci. 374, 20150191 (2016).
(Continued)

*Primary Examiner* — Dzung D Tran
(74) *Attorney, Agent, or Firm* — Lavery, De Billy, LLP; Gwendoline Bruneau

(57) ABSTRACT

A THz waveguide is described, comprising four conductive wires separated by an air gap, the THz waveguide allowing low-loss and dispersion-free propagation of a THz signal. The system for terahertz polarization-division multiplexing comprises at least two THz sources, a THz waveguide and a THz receiver, wherein said THz waveguide comprises four conductive wires separated by an air gap; THz pulses from the THz sources being coupled into the THz waveguide; the THz waveguide transmitting the THz pulses independently, the THz waveguide operating as a broadband polarization-division multiplexer. The method for terahertz polarization-division multiplexing, comprising multiplexing THz pulses from terahertz sources in free-space, coupling resulting multiplexed THz pulses into a THz waveguide comprising four conductive wires separated by an air gap; and demultiplexing the multiplexed THz pulses after propagation in the waveguide.

19 Claims, 14 Drawing Sheets

(56) References Cited

U.S. PATENT DOCUMENTS

| | | | | |
|---|---|---|---|---|
| 2009/0273532 | A1* | 11/2009 | Mendis | H01P 3/12 343/753 |
| 2015/0212060 | A1* | 7/2015 | Van Mechelen | G01N 21/55 250/338.1 |
| 2018/0323825 | A1* | 11/2018 | Cioffi | H04B 3/52 |

OTHER PUBLICATIONS

Bozinovic, N. et al. Terabit-Scale Orbital Angular Momentum Mode Division Multiplexing in Fibers. Science. 340, 1545-1548 (2013).

Chen, Z.-Y. et al. Use of polarization freedom beyond polarization-division multiplexing to support high-speed and spectral-efficient data transmission. Light Sci. Appl. 6, e16207-e16207 (2017).

Rochat, E., Walker, S. D. & Parker, M. C. Polarisation and wavelength division multiplexing at 1.55 μm for bandwidth enhancement of multimode fibre based access networks. Opt. Express 12, 2280 (2004).

Tonouchi, M. Cutting-edge terahertz technology. Nat. Photonics 1, 97-105 (2007).

Dang, S., Amin, O., Shihada, B. & Alouini, M. What should 6G be□? Nat. Electron. 3, (2020).

Ma, J., Karl, N. J., Bretin, S., Ducournau, G. & Mittleman, D. M. Frequency-division multiplexer and demultiplexer for terahertz wireless links. Nat. Commun. 8, 729 (2017).

Koenig, S. et al. Wireless sub-THz communication system with high data rate. Nat. Photonics 7, 977-981 (2013).

Harter, T. et al. Wireless THz link with optoelectronic transmitter and receiver. Optica 6, 1063 (2019).

Li, X. et al. A 400G optical wireless integration delivery system. Opt. Express 21, 18812 (2013).

Oshima, N., Hashimoto, K., Suzuki, S. & Asada, M. Terahertz wireless data transmission with frequency and polarization division multiplexing using resonant-tunneling-diode oscillators. IEEE Trans. Terahertz Sci. Technol. 7, 593-598 (2017).

Zhao, H. et al. Demonstration of orbital angular momentum multiplexing and demultiplexing based on a metasurface in the terahertz band ACS Photonics 5, 1726-1732 (2018).

Nagatsuma, T., Ducournau, G. & Renaud, C. C. Advances in terahertz communications accelerated by photonics. Nat. Photonics 10, 371-379 (2016).

Amarasinghe, Y., Zhang, W., Zhang, R., Mittleman, D. M. & Ma, J. Scattering of terahertz waves by snow. J. Infrared, Millimeter, Terahertz Waves 41, 215-224 (2020).

Ma, J. et al. Security and eavesdropping in terahertz wireless links. Nature 563, 89-93 (2018).

Ma, J., Shrestha, R., Moeller, L. & Mittleman, D. M. Invited Article: Channel performance for indoorand outdoor terahertz wireless links. APL Photonics 3, 051601 (2018).

Nagatsuma, T. et al. Terahertz wireless communications based on photonics technologies. Opt. Express 21, 23736 (2013).

Shrestha, R. et al. A wire waveguide channel for terabit-per-second links. Appl. Phys. Lett. 116, 131102 (2020).

Yang, Y. et al. Terahertz topological photonics for on-chip communication. Nat. Photonics (2020).

Reichel, K. S. et al. Electrically reconfigurable terahertz signal processing devices using liquid metal components. Nat. Commun. 9, 4202 (2018).

Ma, T., Nallapan, K., Guerboukha, H. & Skorobogatiy, M. Analog signal processing in the terahertz communication links using waveguide Bragg gratings: example of dispersion compensation. Opt. Express 25, 11009 (2017).

Mendis, R. & Grischkowsky, D. Undistorted guided-wave propagation of subpicosecond terahertz pulses. Opt. Lett. 26, 846 (2001).

Pahlevaninezhad, H., Darcie, T. E. & Heshmat, B. Two-wire waveguide for terahertz. Opt. Express 18, 7415 (2010).

Mridha, M. K. et al. Active terahertz two-wire waveguides. Opt. Express 22, 22340 (2014).

Karl, N. J., McKinney, R. W., Monnai, Y., Mendis, R. & Mittleman, D. M. Frequency-division multiplexing in the terahertz range using a leaky-wave antenna. Nat. Photonics 9, 717-720 (2015).

Sengupta, K., Nagatsuma, T. & Mittleman, D. M. Terahertz integrated electronic and hybrid electronic-photonic systems. Nat. Electron. 1, 622-635 (2018).

Wang, K. & Mittleman, D. M. Metal wires for terahertz wave guiding. Nature 432, 376-379 (2004).

Deibel, J. A., Wang, K., Escarra, M. D. & Mittleman, D. Enhanced coupling of terahertz radiation to cylindrical wire waveguides Opt. Express 14, 279 (2006).

Mbonye, M., Mendis, R. & Mittleman, D. M. A terahertz two-wire waveguide with low bending loss. Appl. Phys. Lett. 95, 1-4 (2009).

Markov, A., Guerboukha, H. & Skorobogatiy, M. Hybrid metal wire-dielectric terahertz waveguides: challenges and opportunities [Invited]. J Opt. Soc. Am. B 31, 2587 (2014).

Chen, S. & Wang, J. Theoretical analyses on orbital angular momentum modes in conventional graded-index multimode fibre. Sci. Rep. 7, 3990 (2017).

Atakaramians, S., Afshar V., S., Monro, T. M. & Abbott, D. Terahertz dielectric waveguides. Adv. Opt. Photonics 5, 169 (2013).

Tomasino, A. et al. Wideband THz time domain spectroscopy based on optical rectification and electro-optic sampling. Sci. Rep. 3, 3116 (2013).

Wang, K. & Mittleman, D. M. Dispersion of surface plasmon polaritons on metal wires in the terahertz frequency range. Phys. Rev. Lett. 96, 1-4 (2006).

Zhang, Q. et al. Microwave band gap and cavity mode in spoof-insulator-spoof waveguide with multiscale structured surface. J. Phys. D. Appl. Phys. 48, (2015).

Meng, Y. et al. Topological interface states in multiscale spoof-insulator-spoof waveguides. Opt. Lett. 41, 3698 (2016).

Maier, S. A., Andrews, S. R., Martin-Moreno, L. & García-Vidal, F. J. Terahertz surface plasmon-polariton propagation and focusing on periodically corrugated metal wires. Phys. Rev. Lett. 97, 1-4 (2006).

Gan, Q., Fu, Z., Ding, Y. J. & Bartoli, F. J. Ultrawide-bandwidth slow-light system based on THz plasmonic graded metallic grating structures. Phys. Rev. Lett. 100, 256803 (2008).

Lee, E. S. et al. Terahertz band gaps induced by metal grooves inside parallel-plate waveguides. Opt. Express 20, 6116 (2012).

Lee, E. S., Ji, Y. Bin & Jeon, T. I. Terahertz band gap properties by using metal slits in tapered parallel-plate waveguides Appl. Phys. Lett. 97, 95-98 (2010).

Calvanese Strinati, E. et al. 6G: The next frontier: from holographic messaging to ailincial intelligence using subterahertz and visible light communication. IEEE Veh. Technol. Mag. 14, 42-50 (2019).

Saad, W., Bennis, M. & Chen, M. A Vision of 6G wireless systems: applications, trends, technologies, and open research problems. IEEE Netw. 34, 134-142 (2020).

Lee, Y.-S. Principles of Terahertz Science and Technology. (Springer US, 2009).

* cited by examiner

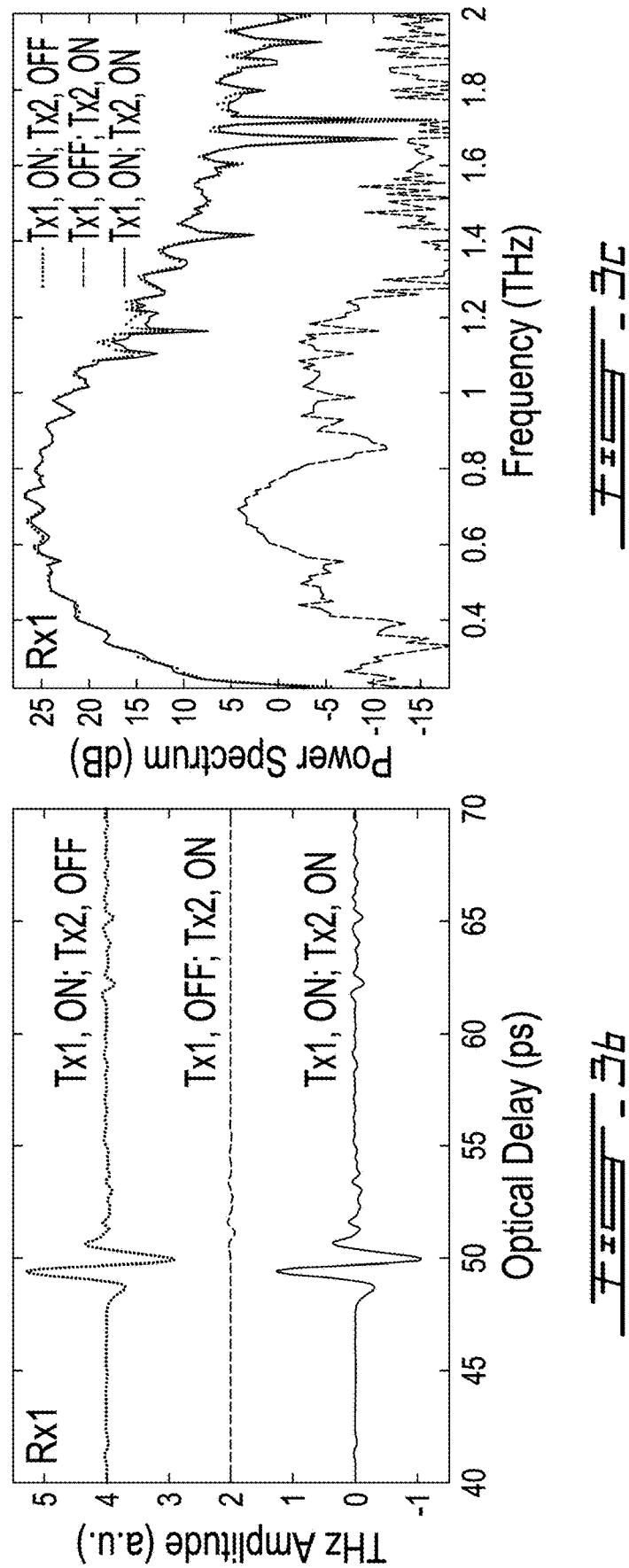

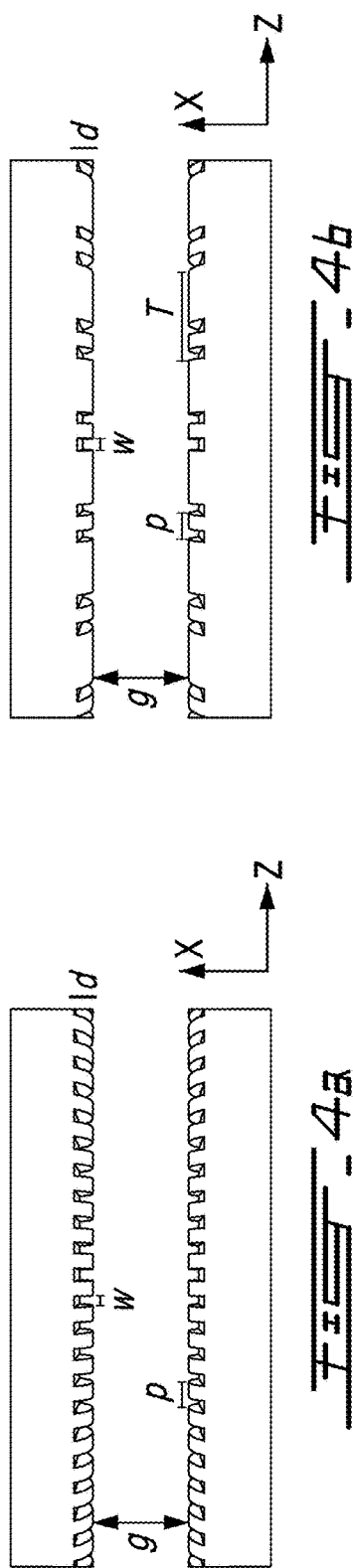
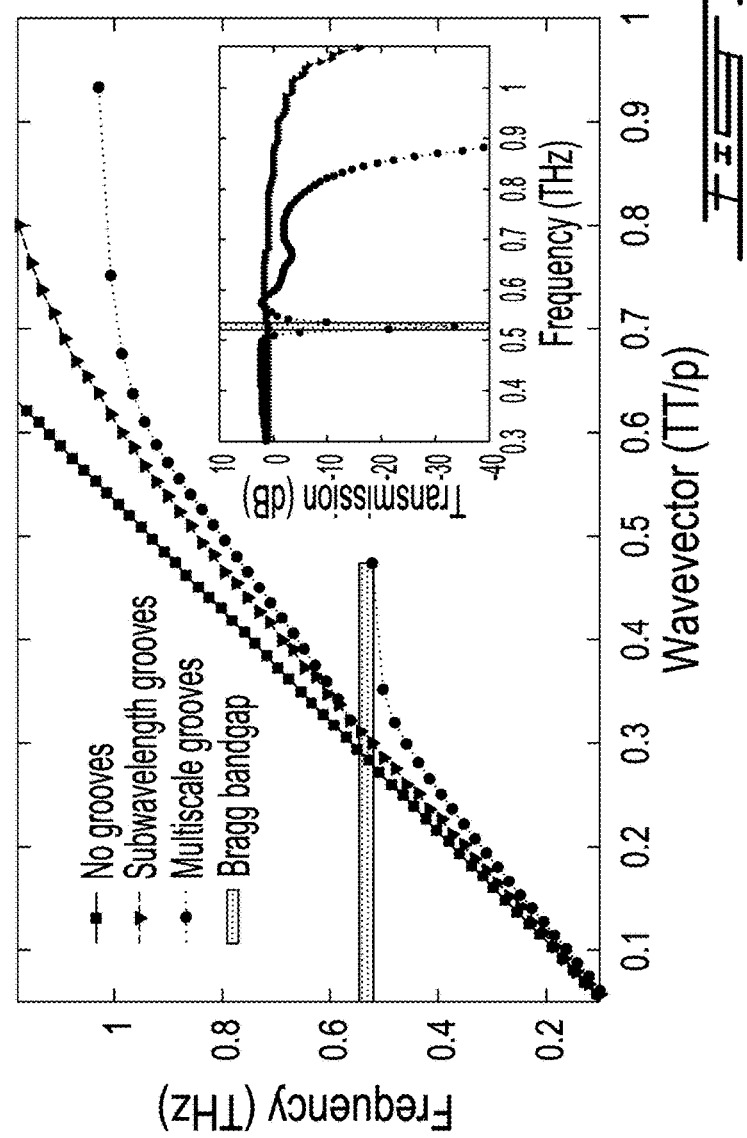
FIG. 4a
FIG. 4b
FIG. 4c

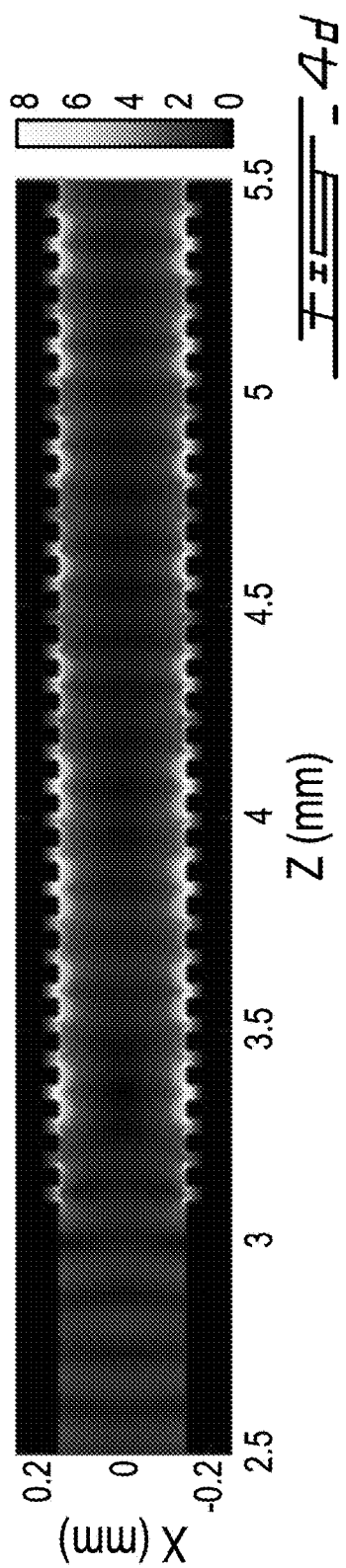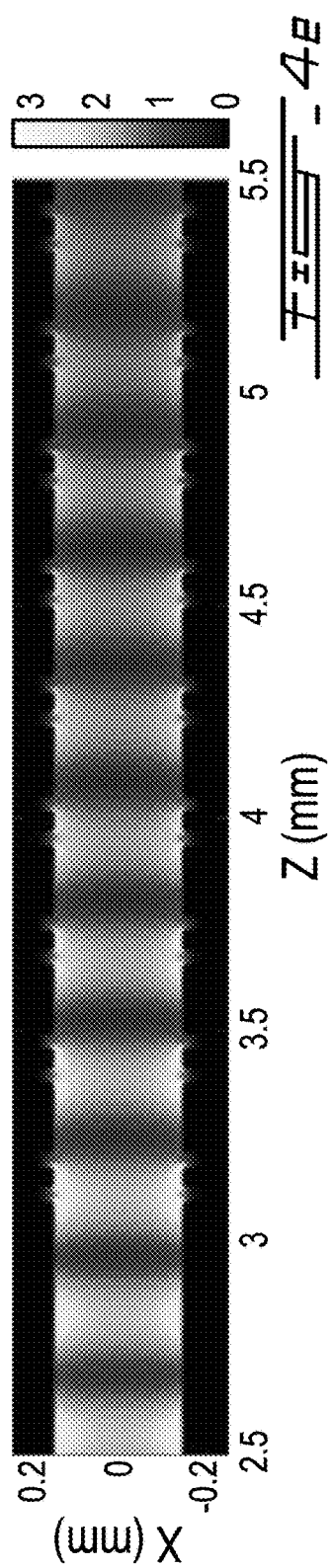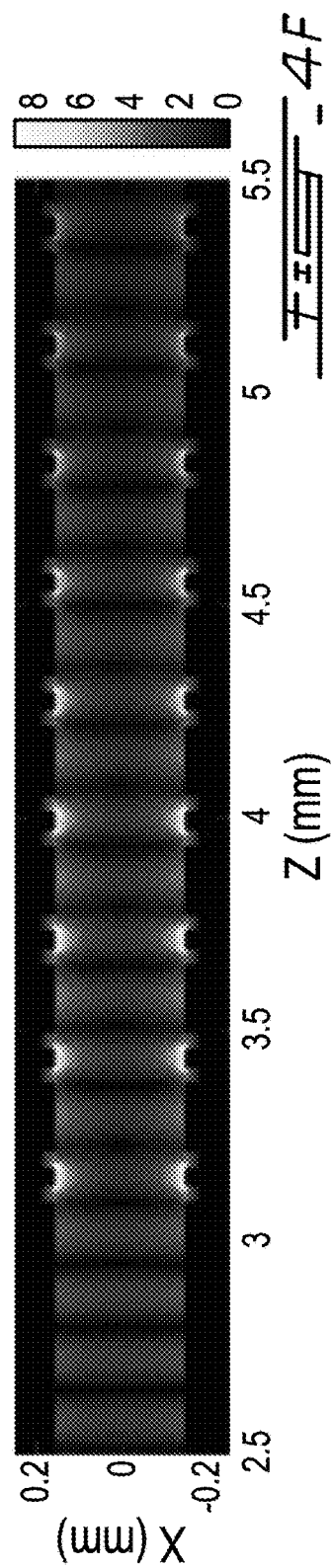
Fig. 4d
Fig. 4e
Fig. 4F

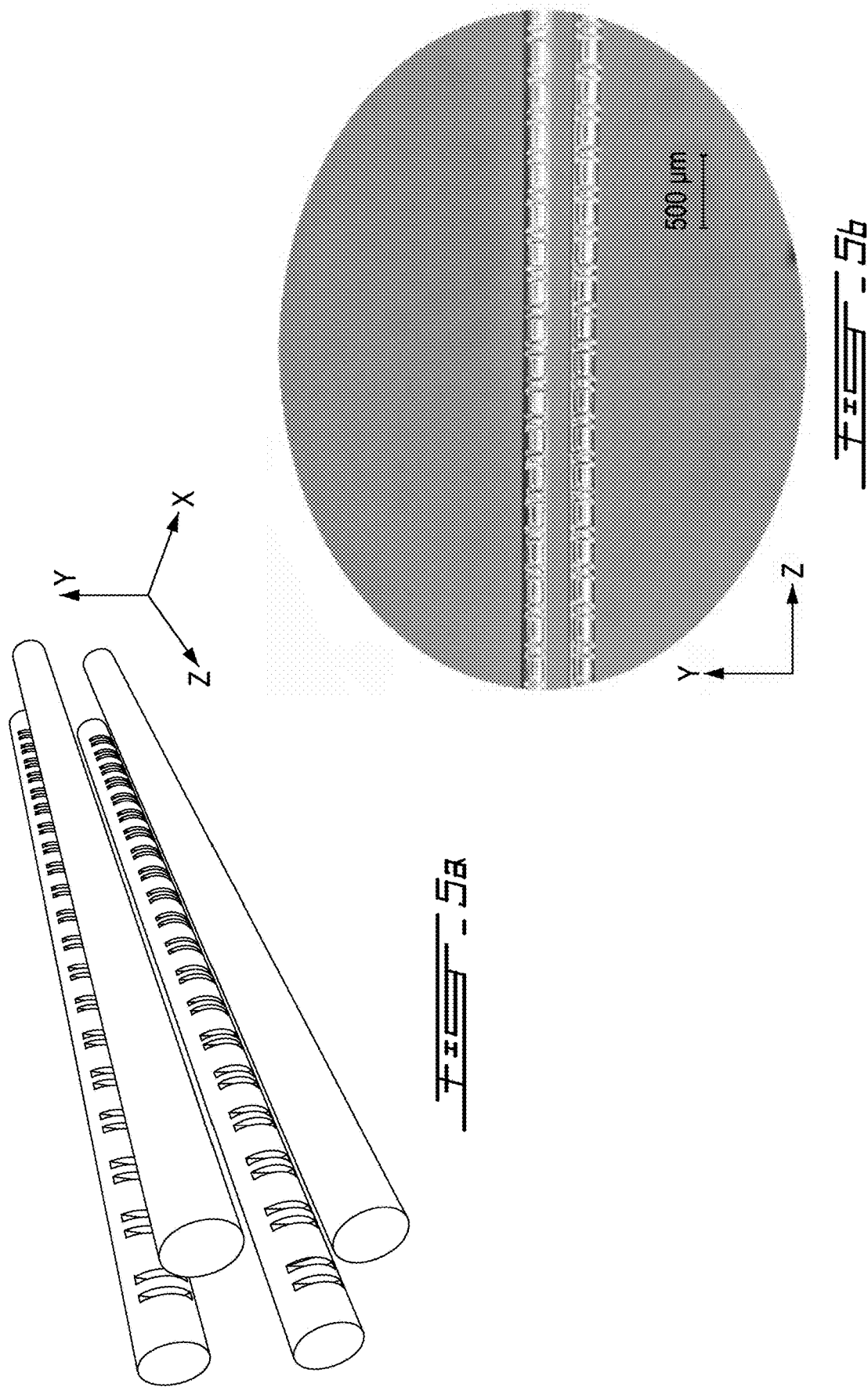

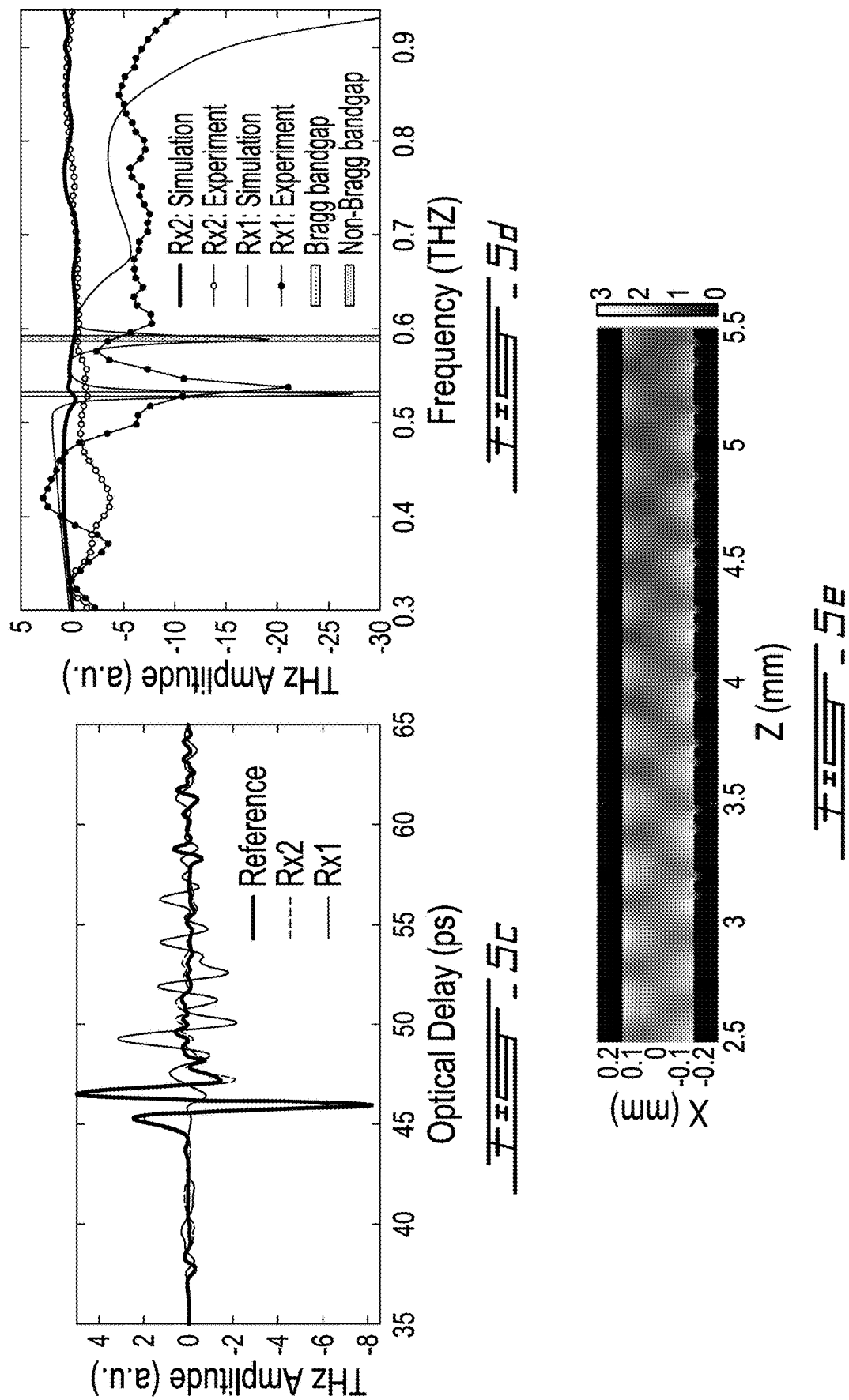

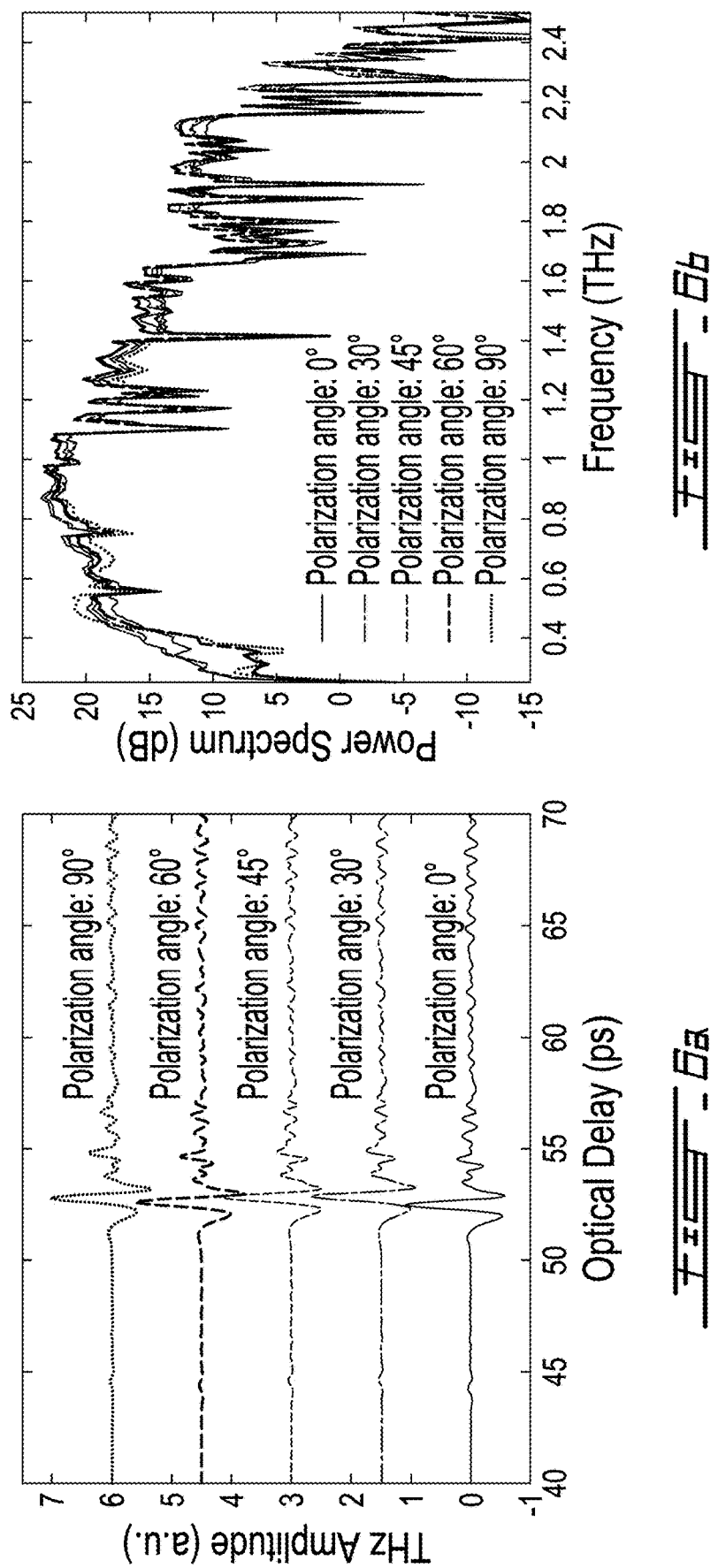

US 11,588,573 B2

SYSTEM AND METHOD FOR TERAHERTZ POLARIZATION-DIVISION MULTIPLEXING

CROSS REFERENCE TO RELATED APPLICATIONS

This application claims benefit of U.S. provisional application Ser. No. 63/053,181, filed on Jul. 17, 2020. All documents above are incorporated herein in their entirety by reference.

FIELD OF THE INVENTION

The present invention relates to terahertz multiplexing. More specifically, the present invention is concerned with a system and a method for terahertz polarization-division multiplexing.

BACKGROUND OF THE INVENTION

Carrying data-streams using terahertz (THz) radiations represents the ultimate technology for the next six-generation (6G) communication networks. Indeed, the THz spectral region offers a higher available bandwidth with respect to the millimeter waves used in the 5G networks and could meet the ever-growing demand for higher data, terabits-per-second (Tb/s) transfer rates. To this end, future THz networks need to integrate the capability of multiplexing.

Multiplexing methods, whereby multiple analog or digital signals are combined into one signal over a shared medium, are used to increase the capacity and spectral efficiency per unit bandwidth of communication systems. Multiplexing methods can generally be applied across five physical divisions, namely frequency, amplitude, phase, polarization, and space. However, only limited physical divisions have been explored in the THz range.

Free-space multiplexing of THz signals, realized in divisions of frequency, polarization and orbital angular momentum, still meets a number of intrinsic challenges, including strong dependence on atmospheric conditions and relatively rapid divergence of the THz beams, especially at lower carrier frequencies, which may cause security and eavesdropping issues of communication links. Furthermore, free-space multiplexing of THz signals can be restricted to line-of-sight communication protocols; for instance, THz polarization-division multiplexing in free-space, due to cross-polarization caused by multipath propagation effects and that in turn cause cross-talk between channels, can only be applied to line-of-sight links. Moreover, free-space multiplexing offers no possibility of manipulating the multiplexed THz signals while propagating.

There is still a need in the art for a system and a method for THz polarization-division multiplexing.

SUMMARY OF THE INVENTION

More specifically, in accordance with the present invention, there is provided a THz waveguide, comprising four conductive wires separated by an air gap, the THz waveguide allowing low-loss and dispersion-free propagation of a THz signal.

There is provided a system for terahertz polarization-division multiplexing, comprising at least two THz sources, a THz waveguide and a THz receiver, wherein said THz waveguide comprises four conductive wires separated by an air gap; THz pulses from the THz sources being coupled into the THz waveguide; the THz waveguide transmitting the THz pulses independently, the THz waveguide operating as a broadband polarization-division multiplexer.

There is provided a method for terahertz polarization-division multiplexing, comprising multiplexing THz pulses from terahertz sources in free-space, coupling resulting multiplexed THz pulses into a THz waveguide comprising four conductive wires separated by an air gap; and demultiplexing the multiplexed THz pulses after propagation in the waveguide.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 2D shows simulated normalized electric-field intensity distribution at 0.5 THz when the incident THz beam features polarization angle of 135°;

FIG. 2E shows simulated normalized electric-field intensity distribution at 0.5 THz when the incident THz beam features polarization angle of 150°;

FIG. 3B shows time-domain THz signals reconstructed via Rx1 under different ON/OFF configurations of Tx1 and Tx2 in the system of FIG. 3A;

FIG. 3C shows the corresponding THz spectra reconstructed via Rx1 under different ON/OFF configurations of Tx1 and Tx2 in the system of FIG. 3A;

FIG. 4A is a cross-sectional view at y=0 of a four-wire waveguide with subwavelength-scale periodic grooves according to an embodiment of an aspect of the present disclosure;

FIG. 4B is a cross-sectional view at y=0 of a four-wire waveguide with multiscale grooves according to an embodiment of an aspect of the present disclosure;

FIG. 4C shows simulated dispersion relations for a plain four-wire waveguide (no grooves), the four-wire waveguide with subwavelength-scale of FIG. 4A and the four-wire waveguide with multiscale grooves of FIG. 4B; inset showing the transmission spectra retrieved after the x-polarized THz beam propagating through the four-wire waveguides with 150-periods-long subwavelength-scale (in full line) and multiscale (in dotted line) groove structures;

FIG. 4D shows the simulated electric-field intensity distribution of the four-wire waveguide with subwavelength-scale grooves of FIG. 4A, evaluated at 1.2 THz;

FIG. 4E shows the simulated THz electric-field intensity distributions of the four-wire waveguide with multiscale grooves of FIG. 4B, evaluated at 0.53 THz;

FIG. 4F shows the simulated THz electric-field intensity distributions of the four-wire waveguide with multiscale grooves of FIG. 4B, evaluated at 1.0 THz;

FIG. 5A is a schematic view of a THz multiplexer with one-sided multiscale grooves according to an embodiment of an aspect of the present disclosure;

FIG. 5B shows an optical microscopic image of the grooves engraved along the two wires of the multiplexer (cross-sectional view at x=0) of FIG. 5A;

FIG. 5C shows the multiplexed THz signals detected via Rx1 and Rx2 recorded and compared to the reference signal;

FIG. 5D shows a comparison between the simulated and experimental transmission spectra of Channels 1 and 2;

FIG. 5E shows simulated THz electric-field intensity distribution in Channel 1, evaluated at 0.59 THz (cross-sectional view at y=0);

FIG. 6A shows experimentally received time-domain signals when the polarization directions of the input THz beams are 0°, 30°, 45°, 60° and 90°, respectively;

FIG. 6B shows the corresponding spectra;

DESCRIPTION OF ILLUSTRATIVE EMBODIMENTS

The present invention is illustrated in further details by the following non-limiting examples.

Figure 1:
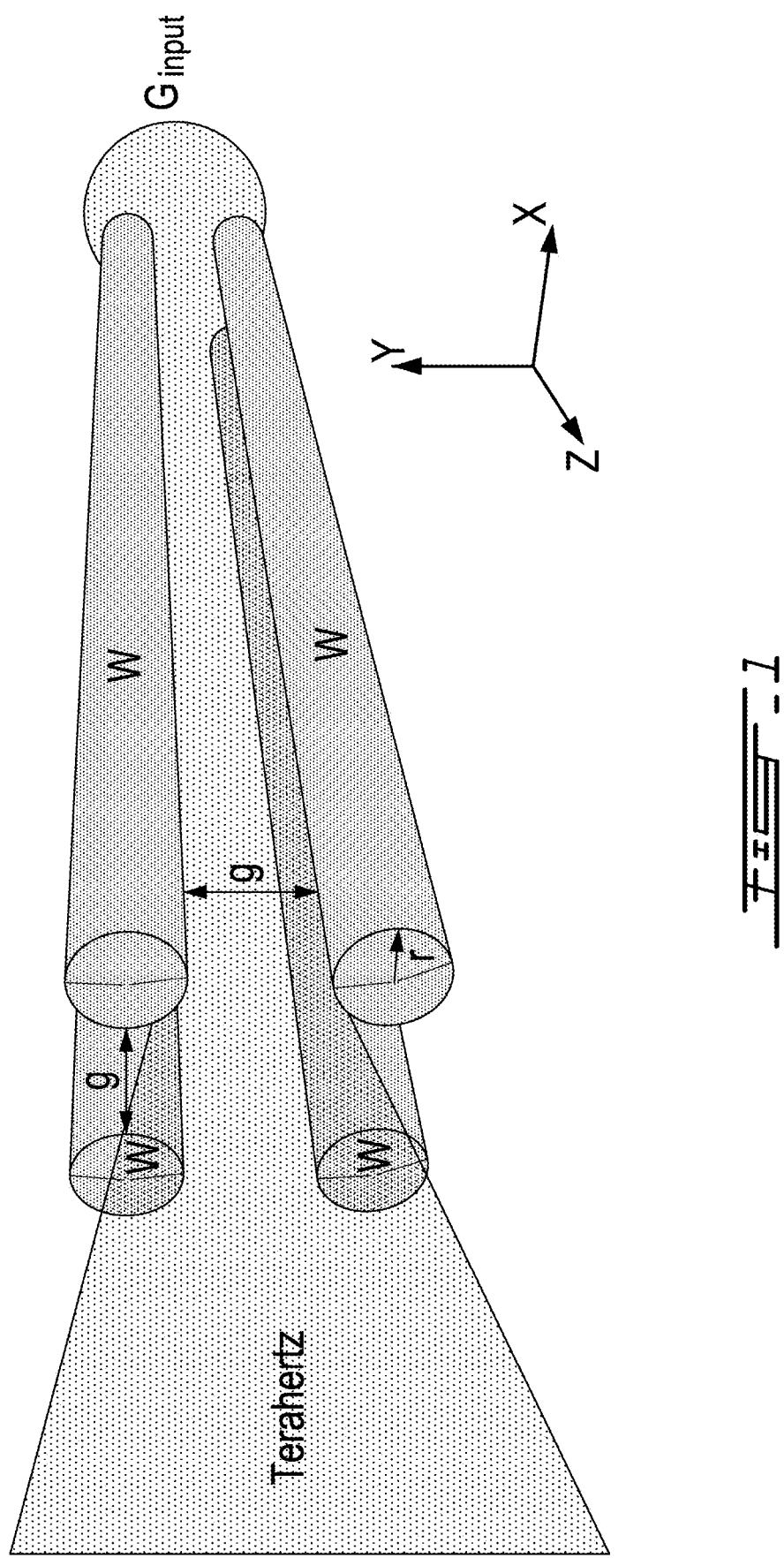
FIG. 1 is a schematic view of a four-wire waveguide (FWWG) according to an embodiment of an aspect of the present disclosure.

As schematically illustrated in FIG. 1, a waveguide according to an embodiment of an aspect of the present disclosure comprises four wires W separated by an air gap g, as shown in FIG. 1.

Figure 3A:
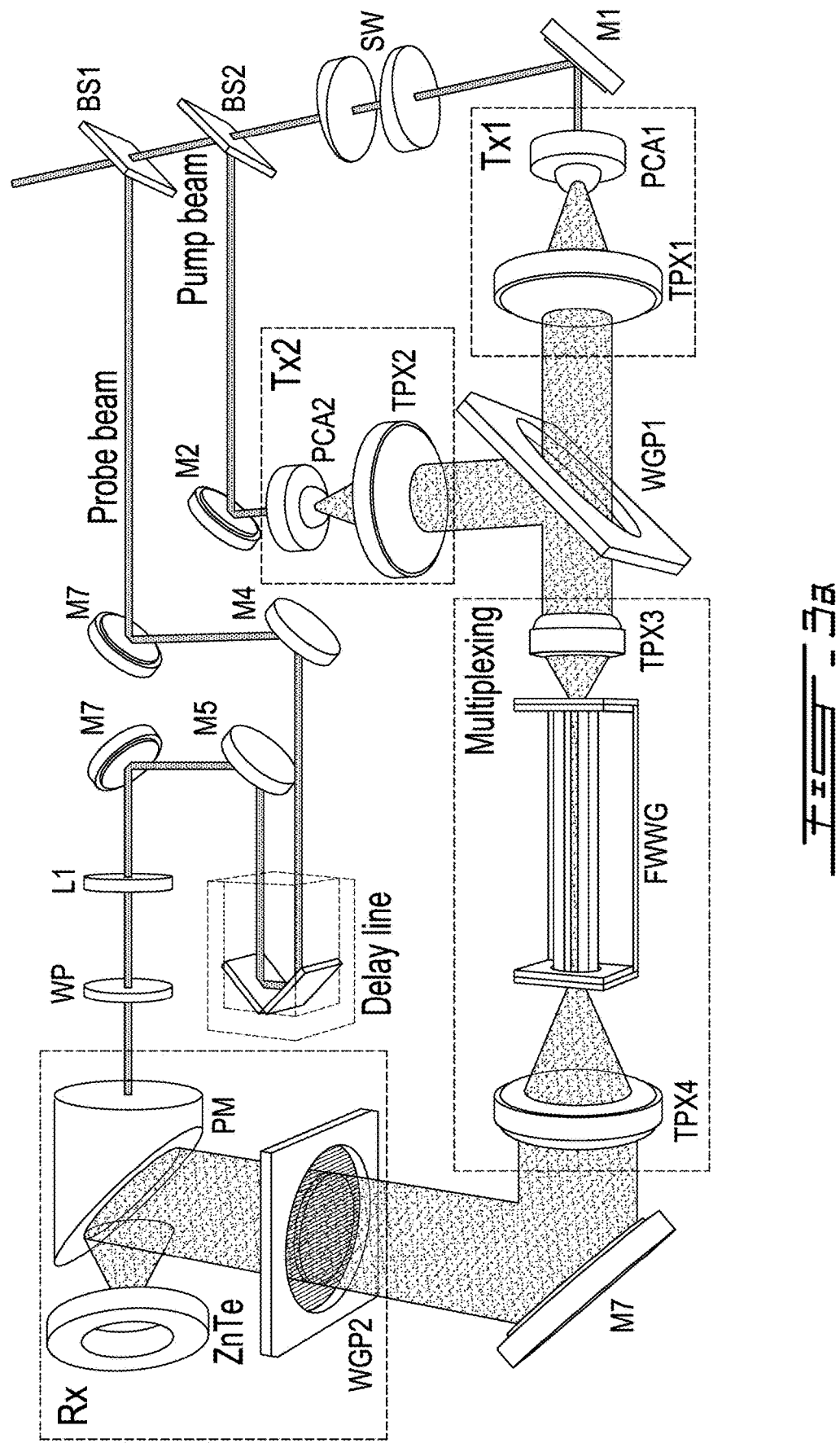
FIG. 3A is a schematic view of a system for polarization-division multiplexing of two broadband THz channels within a four-wire waveguide according to an embodiment of an aspect of the present disclosure.

Experiments will be described hereinbelow using the system illustrated in FIG. 3A. FIG. 3A shows a system for polarization division multiplexing of two THz channels, using two independent broadband transmitters (Tx1 and Tx2) and a single detector (Rx) that detects THz signals (RX) with specific polarization directions: horizontal polarization (RX1) and vertical polarization (RX2). Two identical photoconductive antennas (PCA1 and PCA2), made in GaAs for example, serve as the transmitters, with horizontal polarization in Tx1 and vertical polarization in Tx2 respectively, excited by a pump beam from a short laser pulse (femtosecond pulses, i.e. pulses from tens of fs to hundreds of fs, for example pulses in a range between about 10 fs and about 500 fs) to generate two THz pulses. The two THz channels are first multiplexed in free-space via a wire-grid polarizer (WGP1), then coupled into a four-wire waveguide (FWWG). After propagating through a waveguide (FWWG), the multiplexed THz signals are guided for demultiplexing and detection, by using another wire-grid polarizer (WGP2) and the standard electro-optic sampling method in a ZnTe crystal (in FIG. 3A: TPX: THz Polymethylpentene (TPX) lens; BS: beam splitter; M: mirror; WP: quarter-wave plate; PM: parabolic mirror).

The four-wire waveguide (FWWG) comprises four identical straight and parallel wires made of 10-cm-long copper wires of radius r of 127 µm equally separated by an air gap g of 300 µm into a square core cross-section geometry, and driven by an ultrafast near-infrared pulse train (800 nm, 120 fs, 80 MHz) generated by a Ti:Sapphire laser oscillator (not shown). The pump and probe beams are obtained by means of a 90/10 beam splitter (BS1). The pump beam is further divided by a 50/50 beam splitter (BS2) to excite the photoconductive antennas (PCA1 and PCA2) with an average optical power of 500 mW to generate the two THz pulses, a bipolar square-wave bias voltage, oscillating at 5 kHz and with a peak-to-peak amplitude of 12 V, being generated by a low-noise function generator (not shown) and applied to the photoconductive antennas to generate an electric field required for activating the photoconductive antennas. The THz pulses are detected by the electro-optic sampling method using a thick ZnTe <110> crystal, of a thickness of 3 mm, to achieve a large temporal window in the measurements, which allows acquiring the long-lasting THz transient as modulated by multiscale grooves as discussed hereinbelow In an embodiment described hereinbelow. Each recorded THz waveform is centered in a time window of 1 ps with a time resolution of 0.05 ps. The bandwidth of the THz that can pass through the waveguide and the loss of the waveguide are dependent on the parameters of the waveguide. Increasing the gap size g or the diameter 2r of the wires results in a narrower bandwidth and a higher loss. Using stainless steel wires results in higher loss. The diameter of the wires may be selected, for example, in a range between about 200 and about 500 micrometers, the air gap be selected, for example, in a range between about 300 and about 1000 micrometers, and the total length of the waveguide may be selected, for example, in a range between about 1 cm and about 100 cm, depending on the requirements of applications.

Finite-element-method (FEM) simulation results were obtained using a mode solver (COMSOL™ Multiphysics). The optical properties of copper at THz frequencies are accounted for using the Drude model, which indicates a frequency independent real part of the relative permittivity $\varepsilon_r = -1.7 \times 10^5$ and a frequency independent conductivity $\sigma_0 = 5.96 \times 10^7$ S/m, and the frequency dependent relative permittivity ε of copper at THz frequencies can be modeled as $\varepsilon(v) = -1.7 \times 10^5 + i1.1 \times 10^6 \, v^{-1}$, where $v = \omega/2\pi$ in THz. Scattering boundary conditions were used at the borders of the simulation domain. A scattering boundary condition was used for the waveguide input. The 3D finite-difference time-domain (FDTD) simulation results in FIGS. 4 and 5 were obtained using a FDTD module (Lumerical). A perfect electric conductor was used for the waveguide, and 16 standard perfectly matched layers were used to absorb spurious reflections coming from the domain edges. To excite the four-wires waveguide, a broadband signal with a center frequency of 0.5 THz and a 1-THz-bandwidth was used, while the Gaussian beam profile was considered focused onto the four-wire waveguide input gap ($G_{input}$ FIG. 1) with a waist size of 600 µm. The 3D finite-difference time-domain (FDTD) simulations were evaluated in a time window of 460 ps with a time resolution of 0.02 ps.

Figure 2B:
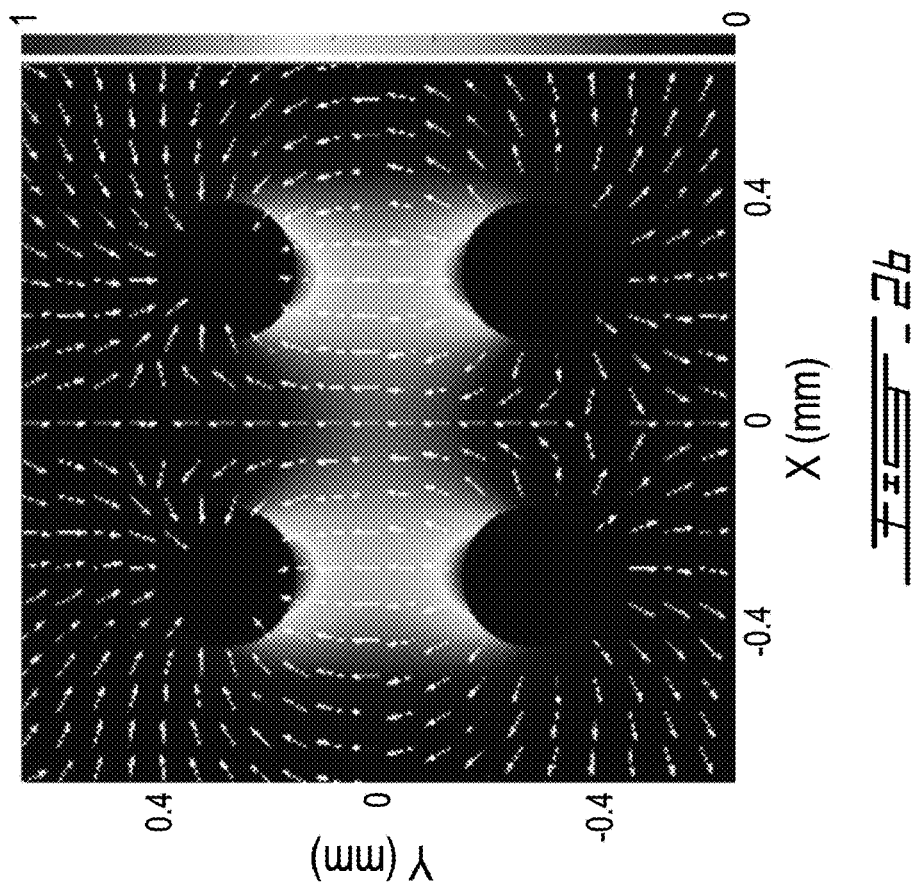
FIG. 2B shows FEM simulations of the normalized electric-field intensity distribution of the fundamental transverse electromagnetic mode $TEM_y$ evaluated at 0.5 THz, excited by the vertically polarized THz beam in the four-wire waveguide of FIG. 1.
Figure 2A:
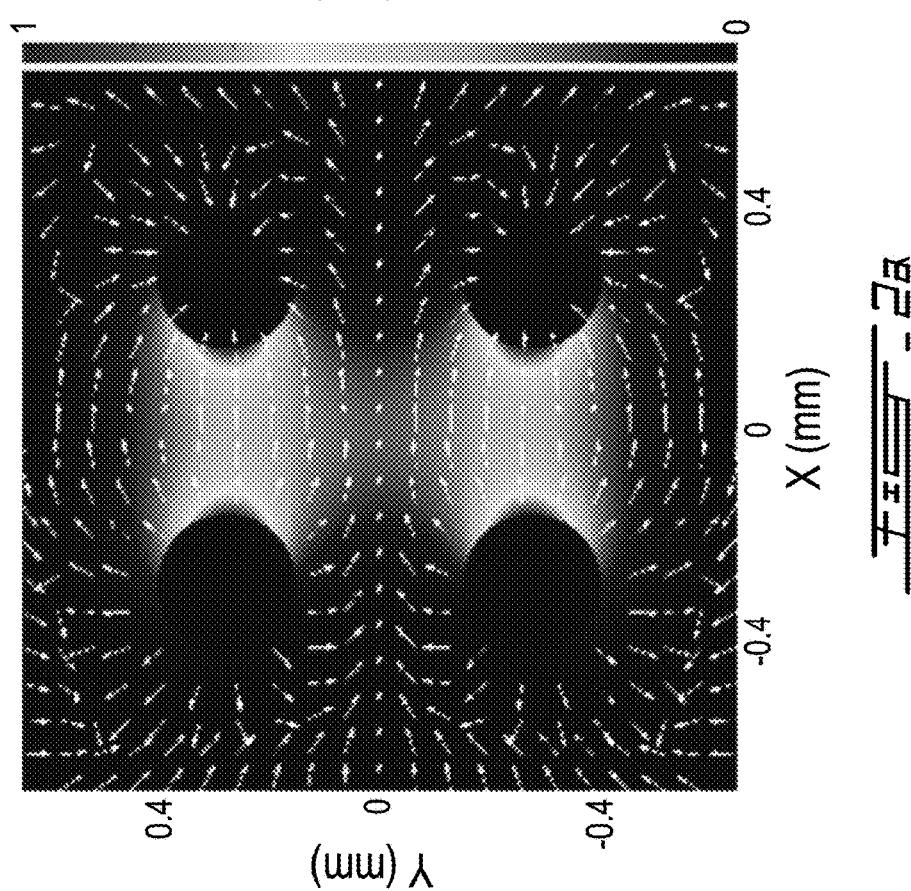
FIG. 2A shows finite element method (FEM) simulations of the normalized electric-field intensity distribution of the fundamental transverse electromagnetic mode $TEM_x$, evaluated at 0.5 THz, excited by the horizontally polarized THz beam in the four-wire waveguide of FIG. 1.
Figure 2C:
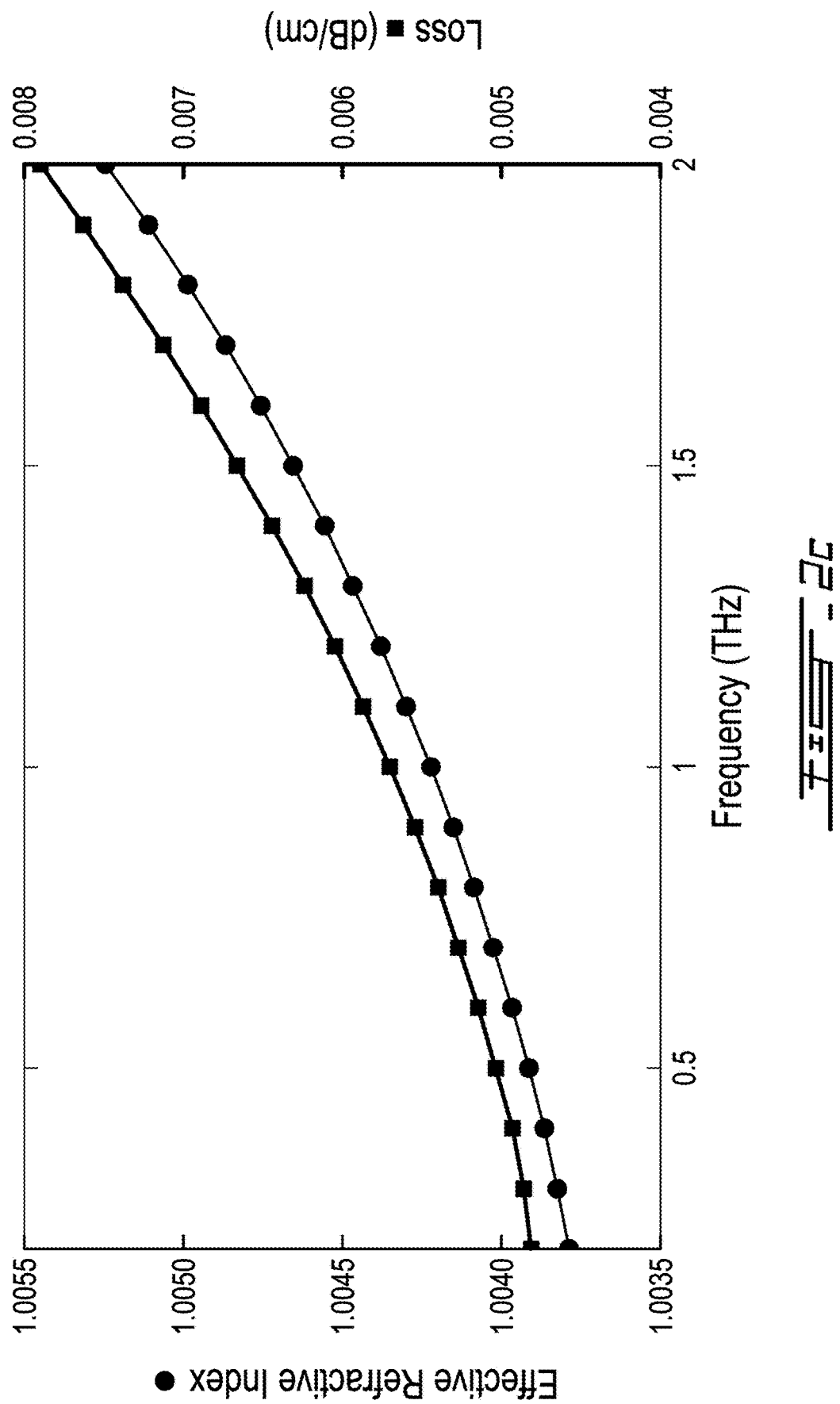
FIG. 2C shows simulated effective refractive indices (circles) and absorption losses (squares) of the fundamental modes as a function of frequency in the four-wire waveguide of FIG. 1.
Figure 2A:
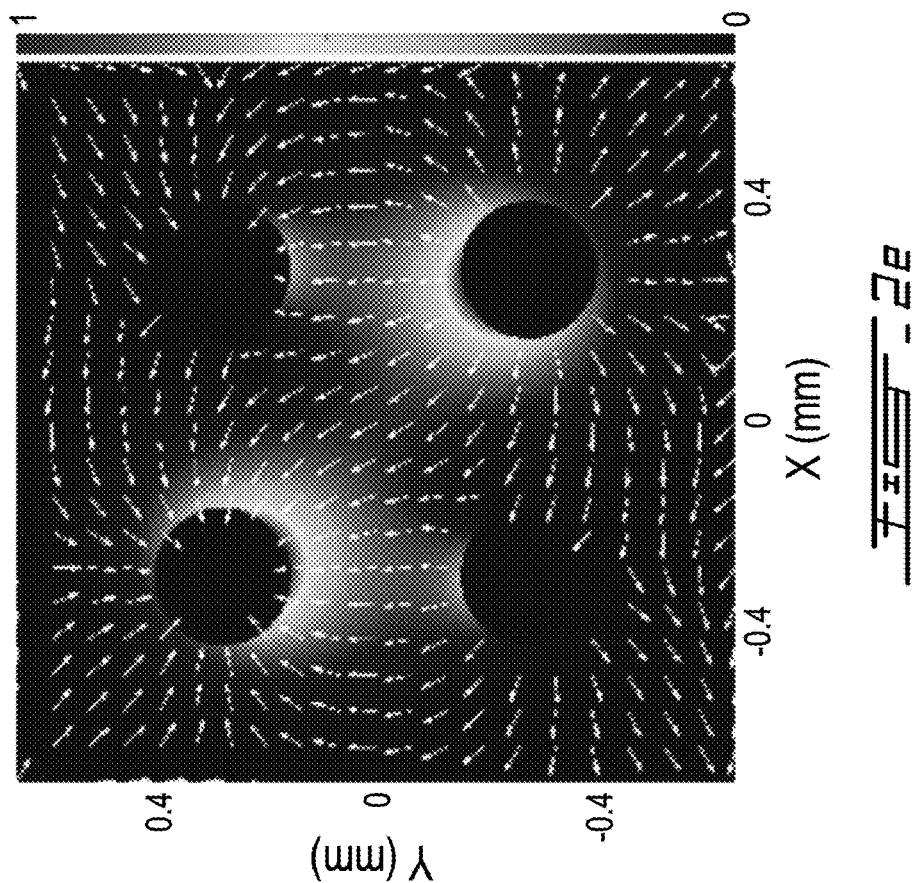
Figure 2B:
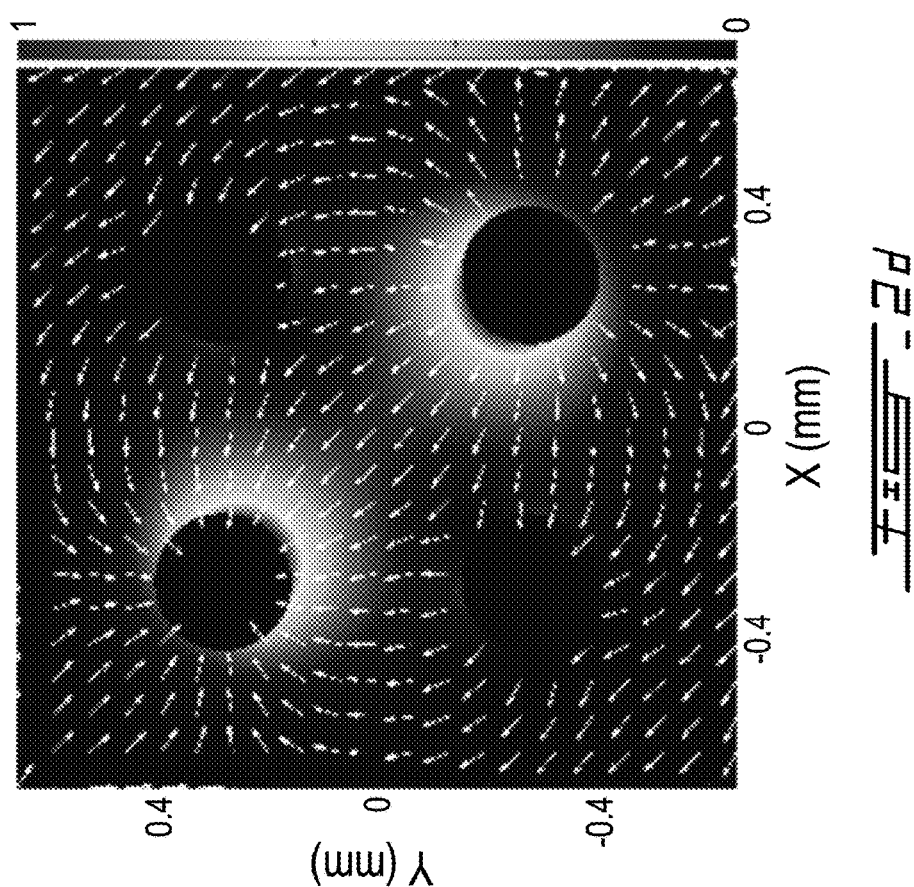

The THz guiding properties of the four-wire waveguide are investigated by performing numerical simulations based on the finite-element-method (FEM). The simulated fundamental TEM modes of the waveguide are evaluated at 0.5 THz. As shown in FIG. 2A and FIG. 2B, due to the symmetrical arrangement of the four wires, the two fundamental transverse modes TEM), (FIG. 2A) and TEM$_y$ (FIG. 2B) have symmetrical field profiles, which are equally divided into two identical portions along the axes. Each portion of the field distribution is mainly confined within two wires and shows a similar profile to that of a two-wire waveguide thus indicating that the four-wire waveguide can also be efficiently excited by a linearly polarized THz input beam. Specifically, depending on the polarization state of the four-wire waveguide excitation source, the fundamental transverse electromagnetic mode TEM), or the fundamental transverse electromagnetic mode TEM$_y$ is excited within the four-wire waveguide, by a horizontally polarized THz beam and a vertically polarized THz beam respectively. Inherited from the THz metal-wire waveguides, the effective refractive index of the fundamental mode is close to 1 (circles in FIG. 2C) and its loss is extremely low, less than about 0.008 dB/cm (squares in FIG. 2C) as retrieved from simulations and shown in FIG. 2C, thus allowing a low-loss and dispersion-free propagation of a broadband THz signal, in a range from about 0.1 THz to about 3.0 THz for example. These results prove that four-wire waveguides can provide a low-loss and dispersion-free propagation of a broadband THz signal.

To verify the independent guidance of THz multiplexed signals within the four-wire waveguide (FWWG), the signals detected by the detector at the receiver (Rx1 and Rx2) under different ON/OFF configurations of the two independent broadband transmitters (Tx1 and Tx2) are compared. A partial overlap in time between the two THz pulses was intentionally introduced using two silica wedges (SW in FIG. 3A). The signals detected via Rx1 and the corresponding spectra are shown in FIGS. 3B and 3C. When the transmitter TX1 is ON and the transmitter Tx2 is OFF (dotted lines in FIGS. 3B and 3C), the signal is detected via Rx1 (FIG. 3B) and the recorded THz pulse has a single-cycle shape (FIG. 3C), indicating that the propagation in the four-wire waveguide (FWWG) is dispersion-free. When the transmitter TX1 is OFF and the transmitter TX2 is ON (stippled line in FIGS. 3B and 3C), no significant signal from the transmitter TX2 (FIG. 3B) is detected via Rx1, and the extinction ratio is over 20 dB (FIG. 3C).

Figures 3D, 3E:
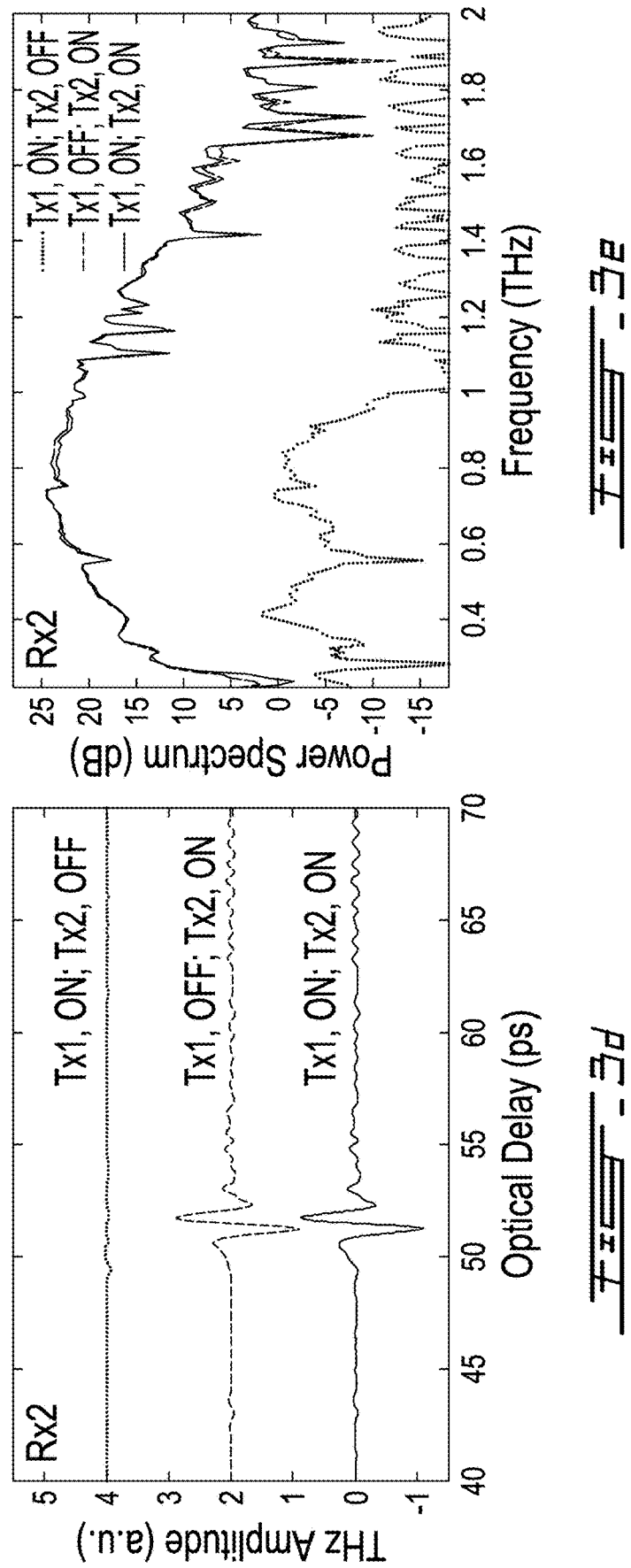
FIG. 3D shows time-domain THz signals reconstructed via Rx2 under different ON/OFF configurations of Tx1 and Tx2 in the system of FIG. 3A.
FIG. 3E shows the corresponding THz spectra reconstructed via Rx2 under different ON/OFF configurations of Tx1 and Tx2 in the system of FIG. 3A.

Regarding polarization-division multiplexing, when both transmitters TX1 and TX2 are ON (full line in FIGS. 3B and 3C), the overall time-domain signal retrieved via Rx1 (FIG. 3B) and its spectrum (FIG. 3C) are almost identical to the case observed when only the transmitter TX1 is ON (dotted lines in FIGS. 3B and 3C), indicating a negligible contribution from the transmitter TX2. When the receiver is switched to Rx2, the results obtained under various ON/OFF configurations of the two transmitters exhibit a behavior consistent with the Rx1 configuration described above (FIGS. 3D and 3E).

Thus it is shown that two broadband THz signals with orthogonal polarization states can be transmitted independently by the fundamental transverse electromagnetic modes, and the four-wire waveguide can be operated as a broadband polarization-division multiplexer.

Moreover, it is shown that the four-wire waveguide is able to guide linearly polarized THz signals with arbitrary polarization directions. As an example, FIGS. 2D and 2E show the normalized electric-field intensity distributions within the four-wire waveguide when the polarization angles of the input THz beams are 135° and 150°, respectively. To analyze the composition of the field distributions and their relationships with the fundamental modes, the charge weight of the fundamental mode is calculated as follows:

$$C_i = \frac{\iint_\infty e(x,y) \cdot \psi_i^*(x,y) dx dy}{\left(\iint_\infty e(x,y) e^*(x,y) \iint_\infty \psi_i(x,y) \cdot \psi_i^*(x,y)\right)^{1/2}}, \quad (1)$$

where $C_i$ is the charge weight and satisfies the normalization condition $\Sigma |C_i|^2 = 1$, $e(x,y)$ is the electric-field transverse profile distributed within the four-wire waveguide and $\psi_i(x,y)$ is the electric-field intensity distribution of the fundamental mode, corresponding to either TEM$_x$ or TEM$_y$. For the case in FIG. 2D, the charge weights are $C_x = -1/\sqrt{2}$ and $C_y = 1/\sqrt{2}$. For the case in FIG. 2E, the charge weights are $C_x = -\frac{1}{2}$ and $C_y = \sqrt{3}/2$. The charge weights are determined by the polarization directions and the electric-field intensity distribution within the four-wire waveguide is the superposition of the two fundamental modes. This observation indicates that a THz beam coupled into the four-wire waveguide with arbitrary polarization directions is decomposed into the two orthogonal polarization states, which then propagate independently along the waveguide according to the two fundamental TEM modes.

Since only one channel is needed for these experiments, the transmitter TX2 is de-activated and the two wire-grid polarizers (WGP1 and WGP2) are removed. The control of the polarization direction of the input THz signal is realized by rotating the photoconductive antenna (PCA1). Then the ZnTe crystal is rotated accordingly to detect the THz signals with specific polarization directions. The experimentally received time-domain signals and the corresponding spectra when the polarization directions of the input THz beams are 0°, 30°, 45°, 60° and 90° are shown in FIGS. 6A and 6B respectively. By changing the polarization directions of the input THz beams, the detected signals after propagating through the 10-cm-long four-wire waveguide feature the same shape in both the time-domain waveforms and the frequency spectra. A slight difference in the signal amplitude and the low-frequency region of the spectra is due to the alignments. Based on the experimental results, it can be concluded that the four-wire waveguide can provide a low-loss and dispersion-free propagation of broadband THz signals with arbitrary linear polarization directions. Experimental results consistently confirm the ability of the four-wire waveguide to transmit broadband THz signals with arbitrary polarization directions in a low-loss and dispersion-free manner.

Leveraging the fact that the THz guidance in metal-wire waveguides is based on the propagation of THz surface plasmon polaritons along the metal-air interface, which is very sensitive to the metal surface conditions, a method according to an aspect of the present disclosure comprises introducing a periodic modulation along the metal surface of the waveguide to manipulate the THz light propagating in the waveguide. Depending on the period size, a periodic structure in the subwavelength scale behaves like a homogeneous medium (metamaterial) and can be treated as an effective medium (see FIG. 4A); the resulting effective refractive index can be controlled, by changing the ratio w/p, where p is the period and w is the width of the grooves, for example. A periodic structure in the wavelength scale is considered as a Bragg structure such as photonic crystals for example (see FIG. 4B). When a periodic array of grooves is engraved on the metal surface, surface states behaving like surface plasmon polaritons, referred to as spoof surface plasmon polaritons, can still be supported.

In experiments, to fabricate subwavelength-scale and multiscale structures on the four-wire waveguides, the copper wires were bound tight on a jig to keep them as straight and flat as possible. Then a quartz plate was placed over the wires, and the wires were glued on the quartz plate with mounting adhesives (Crystalbond™ 509). When the glue was set, the wires were released from the jig, and the quartz plate with the wires was installed on the platen of an automatic dicing saw (Disco™ DAD 3350). The thickness of the diamond blade equipped (Disco™ ZH05-SD20-N1-90EE) is 35 μm, which determines the width w of the grooves. By utilizing the three-dimensional motor control of the dicing saw, the grooves along the wire can be fabricated accordingly. The deviations in the depth of the grooves d are mainly induced by the blade wearing over so many cuts and the wires that sometimes were not laying down flat on the surface of the quartz plate. The width w of the grooves was pretty much constant except that few burrs on the edge of the cuts were present. For mounting the wires, PMMA (poly (methyl methacrylate)) slabs with holes are used to hold and support the wires, and the size of the holes is carefully designed to guarantee that the gap size between the wires is 300 μm. Screws on the slabs are used to mount and tighten the wires.

FIG. 4 show the electromagnetic response of subwavelength-scale and multiscale structures in the four-wire waveguide with respect to the x-polarized THz beam. FIG. 4A is a cross-sectional view at y=0 of a four-wire waveguide with subwavelength-scale periodic grooves, with grooves of a width w of 35 μm, a depth d of 40 μm, and period p of 80 μm. The response of the subwavelength-scale structure on the wire surface of the four-wire waveguide (see FIG. 4A), with respect to the x-polarized THz beam, is numerically investigated via FDTD simulations. As shown in FIG. 4C, the simulated dispersion relation of the plain four-wire waveguide without grooves is linear within the THz bandwidth, indicating a dispersion-free propagation in the waveguide. However, the dispersion relation of the four-wire waveguide with the subwavelength-scale structure is no longer linear and the group velocity $v_g$ of the spoof surface plasmon polaritons decreases as the frequency increases. In particular, a cut-off frequency $f_c$ occurs at about 1.2 THz, showing that the spoof surface plasmon polaritons at such frequency are actually stopped and the THz light above $f_c$ cannot be guided within the waveguide. As shown in FIG. 4D, the simulated THz electric-field intensity distribution at 1.2 THz illustrates that the THz energy is mainly trapped within the grooves without further propagation. The propagation characteristics of the spoof surface plasmon polaritons, $v_g$ and $f_c$, can be tailored by selecting the geometry of the grooves. To achieve a cut-off frequency $f_c$ below 1.0 THz, a larger value of the depth d of the grooves is required. However, from a practical viewpoint, an excessively deep cut on the wires would greatly lower the robustness of the wires, thus potentially leading to their fracture when tension is applied.

To manipulate the frequencies below 1.0 THz while maintaining the robustness of the wires, a wavelength-scale modulation is superimposed to the above subwavelength-scale grooves. As shown in FIG. 4B, the four-wire waveguide with a multiscale structure is obtained by introducing a periodic modulation T of 280 μm to the subwavelength-scale grooves of FIG. 4A. In FIG. 4C, the simulated dispersion relation of the four-wire waveguide with multiscale grooves indicates the existence of a Bragg bandgap at 0.53 THz, given by $f_{Bragg}=(m \cdot c)/(2T)$, where c is the speed of light and m is an integer. The cut-off frequency $f_c$ is shifted to about 1.0 THz. Moreover, the simulated transmission spectra, by calculating the ratio between the power spectra of the signals propagating through the four-wire waveguide with and without grooves (150-periods-long), are retrieved via FDTD simulations and shown in the inset of FIG. 4C. Compared with the transmission spectrum in case of subwavelength-scale grooves, the transmission spectrum with multiscale grooves exhibits a Bragg bandgap at 0.53 THz with a notch depth of 35 dB. The simulated THz electric-field intensity distributions also confirm the Bragg effect at 0.53 THz (FIG. 4E), and the local trapping of the THz energy around the wire surface, resulting in no propagation, at 1.0 THz (FIG. 4F). By selecting the period of the wavelength-scale modulation T, the location of the Bragg bandgap can thus be tuned over a broad THz range within 1 THz.

Figure 7:
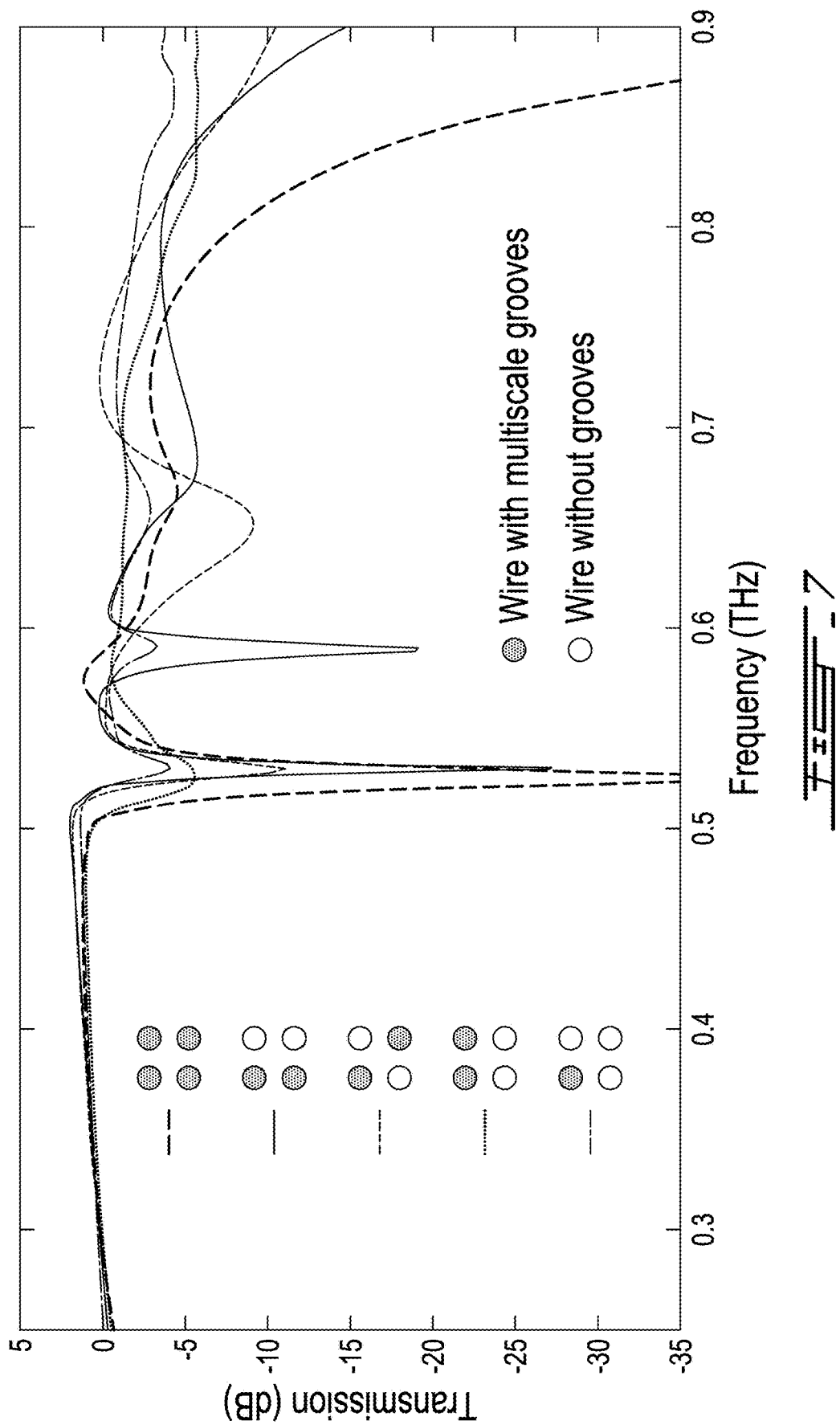
FIG. 7 shows the simulated transmission spectra of Channel 1 with engraved multiscale grooves on different wires, considering the cases when the shifts between the grooves are perfectly aligned.

In principle, to achieve the best modulation of the THz signals in Channel 1, the designed multiscale grooves should be engraved on all the four wires by cutting the wires along the y-direction, leading to the grooves facing towards each other in the x-direction. To simplify the alignment of shifts and achieve a perfect alignment of the shifts between four wires, in experiments only two wires of the four-wire waveguide were engraved with the multiscale grooves. FDTD simulations indicate that when all the four wires are engraved, the notch depth of the Bragg bandgap achieved is over 35 dB, and that when two of the four wires are engraved with the multiscale grooves, the notch depth of the Bragg bandgap is maximized when the two wires are selected from one side of the four-wire waveguide, as shown in FIG. 7. The notch depth achieved in this case is over 25 dB. This reasonable sacrifice in the notch depth can greatly decrease the difficulty of aligning the shifts between the grooves.

Figure 8:
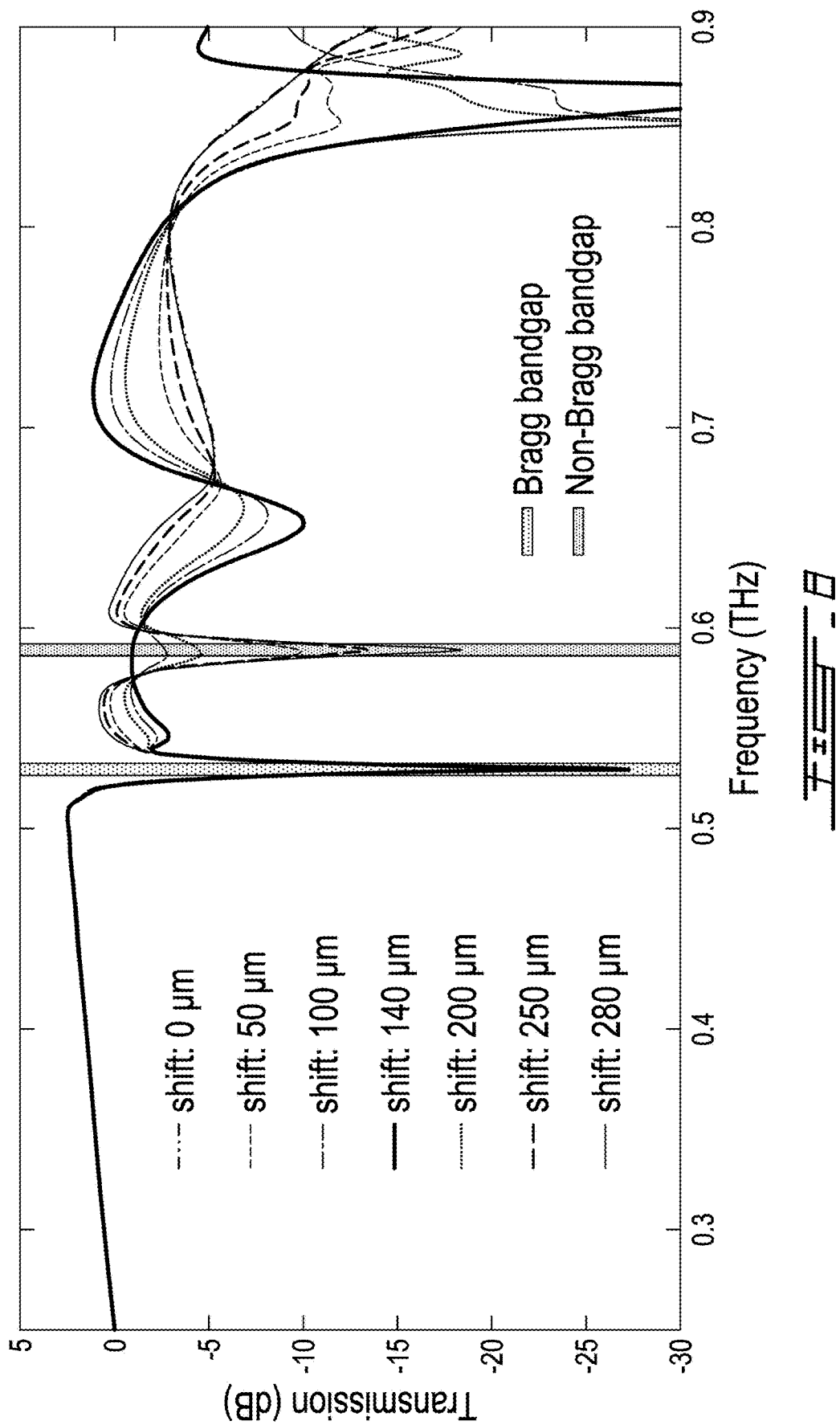
FIG. 8 shows simulated transmission spectra of Channel 1 when the shifts between the grooves on the two wires are 0 µm, 50 µm, 100 µm, 140 µm, 200 µm, 250 µm, and 280 µm, respectively.

FDTD simulations to investigate the influence of the shifts between the grooves on the transmission spectrum of Channel 1, are performed and the simulated transmission spectra are shown in FIG. 8. For the Bragg bandgap, neither the location at 0.53 THz nor the notch depth are influenced by the shifts. In contrast, the notch depth of the non-Bragg bandgap is sensitive to the shifts between the grooves, and reaches a maximum when the grooves are perfectly aligned, with no shift or shift in units of the period T. The simulated transmission spectra also demonstrate that the spectra in the frequency range between 0.6 THz and 0.9 THz are also influenced by the shifts. The simulated spectra only consider the cases with constant shifts. In practice, consistent shifts may be difficult to achieve due to the difference in tightening of the wires. Therefore, no clear identification of the non-Bragg stopband can be observed in the experimental transmission spectra.

A THz polarization-division multiplexer with multiscale grooves is fabricated. FIG. 5 show results of a THz polarization-division multiplexer with an embedded THz channel filter. Due to the non-trivial alignment of the multiscale structures realized onto different wires as discussed hereinabove, grooves are only engraved along the two wires on one side of the four-wire waveguide, as shown in FIG. 5A. After mounting and stretching the two wires with grooves, an optical microscopic image, shown in FIG. 5B, is used to verify the alignment and a minimal lateral shift between the two multiscale grooves. Since the grooves are shallow, it is expected that the grooves mainly interact with the x-polarized THz beam and barely influence the y-polarized THz beam. Therefore, in principle, this multiplexer features a notch filtering at 0.53 THz in Channel 1 and an all-pass filtering in Channel 2. The experimental characterization of this device is performed by using the THz polarization-division multiplexer of FIG. 3A. The THz signals received via Rx1 and Rx2 after demultiplexing are shown in FIG. 5C. Compared to the reference signal obtained from the four-wire waveguide without grooves, the THz signal received via Rx1 is attenuated in amplitude and delayed in time due to the interaction with the grooves. In particular, a long-lasting ringing signal, following the main THz pulse cycle, is also observed, which is ascribed to the strong resonance dip in the frequency domain. In contrast, the signal detected via Rx2 displays the same pulse shape with a slightly lower peak value with respect to that of the reference signal, demonstrating the slight influence of the grooves in Channel 2. It is thus confirmed that the one-sided multiscale grooves mainly interact with the x-polarized THz beam in Channel 1 and barely influence the y-polarized THz beam in Channel 2.

A thorough investigation of this multiplexer relies on analyzing the transmission spectra of both channels. In detail, for each channel, the ratio between the power spectrum of the received signal is compared with the power spectrum of the reference signal, and with the power spectrum obtained by FDTD simulations, as shown in FIG. 5D. For Channel 1, the experimental transmission spectrum exhibits a Bragg bandgap at about 0.53 THz with a notch depth of over 20 dB as expected. Due to the deviations of periods in the fabrication process and the influence of the wire tightening, the observed linewidth of the Bragg resonance is wider compared with that predicted in the simulation. Besides the Bragg bandgap, a non-Bragg bandgap at 0.59 THz in the simulated transmission spectrum cannot be identified in the experimental transmission spectrum. In fact, the origin of this non-Bragg bandgap is attributed to the half-of-the-wavelength delay, in out-of-phase condition, between the THz electric-fields propagating along the asymmetric structure made of wires with and without the grooves. FIG. 5E shows the simulated THz electric-field intensity distribution at 0.59 THz, which reveals that the electric-field propagating on the side with the grooves is out of phase with the electric-field propagating on the side without the grooves. Moreover, both the location and the notch depth of the non-Bragg bandgap are affected by the shifts between the grooves on the two wires, and its notch depth reaches a maximum when the grooves are perfectly aligned. Experimentally, since the tension is manually applied onto the wires, it results in a slight stretch of the periods of both the sub- and wavelength scale structures; in addition, such a stretch is not equal for each wire due to the uneven tightening. As a result, when the two wires are mounted, the shifts between the grooves on different wires are non-consistent along the propagation direction, as observed in FIG. 5B. This fact explains why there is no clear identification of the non-Bragg bandgap in the experimental transmission spectrum, rather an additional loss of about 6 dB across the frequency range from 0.6 THz to 0.9 THz. Nevertheless, the shifts between the grooves have no impact on the notch depth of the Bragg bandgap, as confirmed by numerical simulations, and are thus not influencing the performance of the designed filtering function in Channel 1. For Channel 2, the experimental transmission spectrum exhibits an all-pass response as predicted in simulations, except for a slight loss, less than 5 dB, in the low-frequency region at about 0.4 THz. This loss is due to cutting burrs created around the edges of the grooves during the fabrication; indeed, THz field distribution features a larger transverse profile at low frequencies than at high frequencies, since at high frequencies the THz electric field is more confined within the wire gap, and, as a result, the low-frequency components of the THz light in Channel 2 can reach the cutting burrs, in turn leading to the loss due to scattering. The losses can be minimized by using more sophisticated techniques for fabricating the grooves and mounting/aligning the wires, and the notch depth of the Bragg bandgap can be further improved by increasing the number of periods.

As people in the art will now be in a position to appreciate, regarding the capability of signal transporting, it is thus demonstrated that the present four-wire waveguide provides two independent channels with orthogonal polarization states for the low-loss (<0.008 dB/cm) and dispersion-free propagation of broadband THz signals (from 0.3 THz to 2 THz). In particular, it is shown that the four-wire waveguide supports the propagation of broadband THz signals with arbitrary polarization directions.

Concerning the capability of signal processing, the integration of multiscale grooves into the four-wire waveguide is presented for the independent manipulation of multiplexed THz channels. As a proof-of-concept, a notch filter at 0.53 THz has been enabled in the target channel without influencing the all-pass filtering of the other channel. The THz response of the multiscale structures can be tailored by altering the geometry and periodicity of the grooves. Such approach paves the way for the realization of versatile signal-processing functionalities into different multiplexed THz channels, including custom-engineered filtering, time differentiation and integration, modulation, and demodulation.

Since the four-wire waveguide allows for the propagation of broadband THz signals, the present system shows a great potential in supporting PDM and FDM simultaneously, which is anticipated as a key strategy to dramatically enhance the system capacity and eventually achieve the data-rate target of Tb/s in the future THz networks.

It is shown that the system in FIG. 3A, comprising a first antenna transmitting THz waves with their electric field horizontal (horizontal polarization), and a second antenna which transmits THz waves with their electric field vertical (vertical polarization), thus achieves THz polarization-division multiplexing and transmits two separate THz channels on, using orthogonal polarization, within the four-wire waveguide FWWG. The two separate THz channels are received by a THz detector at a single receiver.

Thus, the present system efficiently multiplexes the THz signals and allows two channels of information to be transmitted by using waves of two orthogonal polarization state. There is thus provided a polarization-division multiplexer based on a four-wire waveguide hosting two independent channels with orthogonal polarization states allowing low-loss and dispersion-free propagation of broadband THz signals. This system achieves the independent manipulation of multiplexed THz channels. By engraving grooves with multiscale structures, the transmission behavior of a target channel can be tailored without interfering with the other one. A range of THz sources may be used, such as PCAs made in GaAs, or other another semi-insulating semi-conductor such as InGaAs, AlGaAs, InP or SiC for example, a non-linear material. A range of THz detector may be used.

The present polarization-division multiplexer may be used to fulfill versatile signal-processing functionalities into independent channels. The present four-wire waveguide made of four conductive wires provides two independent channels with orthogonal polarization states for the low-loss and dispersion-free propagation of broadband THz signals. To realize the independent processing of multiplexed THz signals, multiscale grooves, by integrating a wavelength-scale periodic modulation to subwavelength-scale periodic grooves, are designed and engraved onto the wires. Such an approach, combining the merits of photonic crystals and metamaterials, offers more degrees of freedom to tailor the electromagnetic behavior of the entire structure. As a proof-of-concept, a THz channel filter was successfully introduced into one target channel of the multiplexer, without interfering with the other channel. Integration of multiscale structures into the four-wire waveguide yields an effective paradigm for the independent manipulation of polarization-division multiplexed channels with low loss over a broad THz frequency range.

There is thus provided a THz polarization-division multiplexer supports polarization-division multiplexing and frequency-division multiplexing simultaneously, which may be used to enhance the capacity to achieve data-rate targets of Tb/s in future terahertz networks.

The present THz polarization-division multiplexer can be applied in applications which combine extreme data-rates with agility, reliability, zero response time, and artificial intelligence, such as the multi-channel transmission of uncompressed ultra-high-definition video, holographic communications, ultra-high-speed short-distance data transfer between devices, as well as chip-to-chip communications.

The scope of the claims should not be limited by the embodiments set forth in the examples, but should be given the broadest interpretation consistent with the description as a whole.

The invention claimed is:

1. A THz waveguide, comprising four conductive wires separated by an air gap, the THz waveguide allowing low-loss and dispersion-free propagation of a THz signal, wherein, depending on a polarization state of an excitation source, fundamental transverse electromagnetic modes TEMx and TEMy are excited within the waveguide, by a horizontally polarized THz beam and a vertically polarized THz beam respectively, and the waveguide independently guides THz multiplexed signals.

2. The THz waveguide of claim 1, allowing low-loss and dispersion-free propagation of a broadband THz signal in a range between 0.1 THz and 3.0 THz.

3. The THz waveguide of claim 1, wherein at least one of: i) a diameter of the wires; and ii) the air gap, is selected according to a target bandwidth of a THz signal propagating through the waveguide.

4. The THz waveguide of claim 1, wherein at least one of: i) a diameter of the wires; and ii) the air gap, is selected according to a target loss of the waveguide.

5. The THz waveguide of claim 1, wherein the air gap is selected according to a target loss of the waveguide.

6. The THz waveguide of claim 1, wherein the wires are metallic wires.

7. The THz waveguide of claim 1, comprising multiscale-structured grooves along the wires.

8. A THz waveguide, comprising four conductive wires separated by an air gap, the THz waveguide allowing low-loss and dispersion-free propagation of a THz signal, wherein, depending on a polarization state of an excitation source, fundamental transverse electromagnetic modes TEMx and TEMy are excited within the waveguide, by a horizontally polarized THz beam and a vertically polarized THz beam respectively, and the fundamental transverse electromagnetic modes transmit two broadband THz signals with orthogonal polarization states independently, the four-wire waveguide operating as a broadband polarization-division multiplexer.

9. A THz waveguide, comprising four conductive wires separated by an air gap, the THz waveguide allowing low-loss and dispersion-free propagation of a THz signal, wherein, depending on a polarization state of an excitation source, fundamental transverse electromagnetic modes TEMx and TEMy are excited within the waveguide, by a horizontally polarized THz beam and a vertically polarized THz beam respectively, a THz beam coupled into the waveguide with arbitrary polarization directions being decomposed into the fundamental transverse electromagnetic modes TEMx and TEMy of the waveguide, and propagating independently along the waveguide according to the two fundamental modes.

10. A system for terahertz polarization-division multiplexing, comprising at least two THz sources; a THz waveguide and a THz receiver, wherein said THz waveguide comprises four conductive wires separated by an air gap; THz pulses from the THz sources being coupled into the THz waveguide; wherein, depending on a polarization state of an excitation source, fundamental transverse electromagnetic modes TEMx and TEMy are excited within the waveguide, by a horizontally polarized THz beam and a vertically polarized THz beam respectively, and the fundamental transverse electromagnetic modes transmit two broadband THz signals with orthogonal polarization states independently, the four-wire waveguide operating as a broadband polarization-division multiplexer.

11. The system of claim 10, wherein said THz sources comprise THz photoconductive antennas excited with femtosecond pulses.

12. The system of claim 10, wherein said THz receiver comprises a ZnTe crystal.

13. The system of claim 10, wherein at least one: i) a diameter of the wires and ii) the air gap, is selected according to at least one of: i) a target bandwidth of THz signals propagating through the THz waveguide, and ii) a target loss of the THz waveguide.

14. The system of claim 10, wherein the wires are metallic wires.

15. The system of claim 10, wherein said THz waveguide is engraved with multiscale-structured grooves along the wires thereof.

16. A method for terahertz polarization-division multiplexing, comprising multiplexing THz pulses from terahertz sources in free-space, coupling resulting multiplexed THz pulses into a THz waveguide comprising four conductive wires separated by an air gap; and demultiplexing the multiplexed THz pulses after propagation in the waveguide, wherein, depending on a polarization state of an excitation source, fundamental transverse electromagnetic modes TEMx and TEMy are excited within the waveguide, by a horizontally polarized THz beam and a vertically polarized THz beam respectively, and the fundamental transverse electromagnetic modes transmit two broadband THz signals with orthogonal polarization states independently, the four-wire waveguide operating as a broadband polarization-division multiplexer.

17. The method of claim 16, comprising selecting at least one: i) a diameter of the wires and ii) the air gap, according to at least one of: i) a target bandwidth of THz signals propagating through the THz waveguide, and ii) a target loss of the THz waveguide.

18. The method of claim 16, comprising providing multiscale-structured grooves along the wires of the waveguide.

19. The method of claim 16, comprising independent manipulation of the multiplexed THz signals by integrating multiscale-structured grooves into the waveguide.

\* \* \* \* \*